July 29, 1930.  W. C. CRAWFORD  1,771,434
BREAD SLICER
Filed Dec. 6, 1928
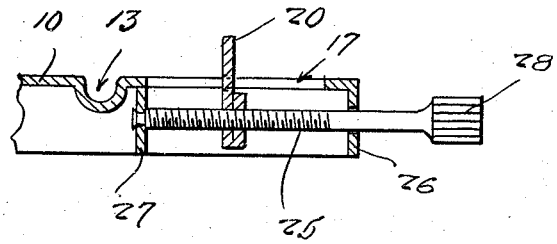
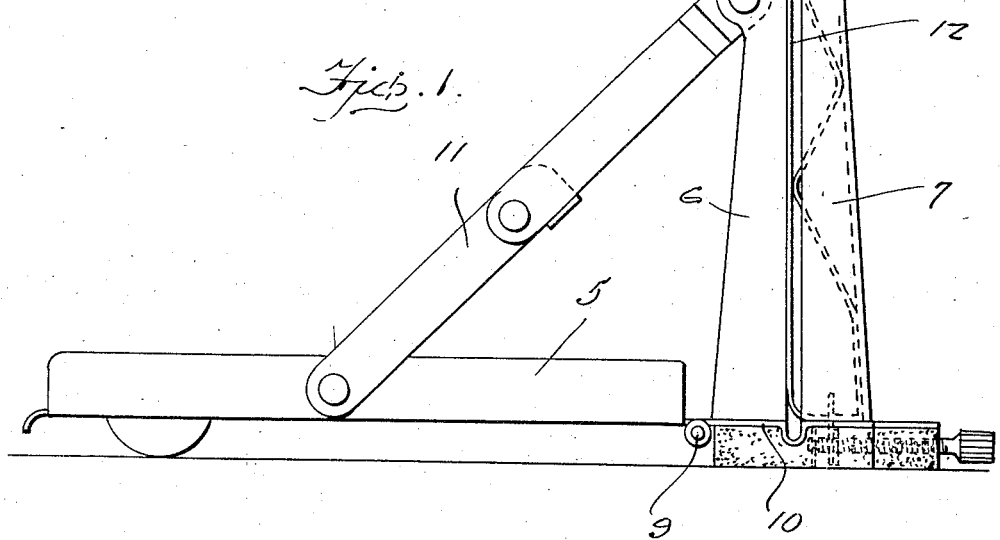
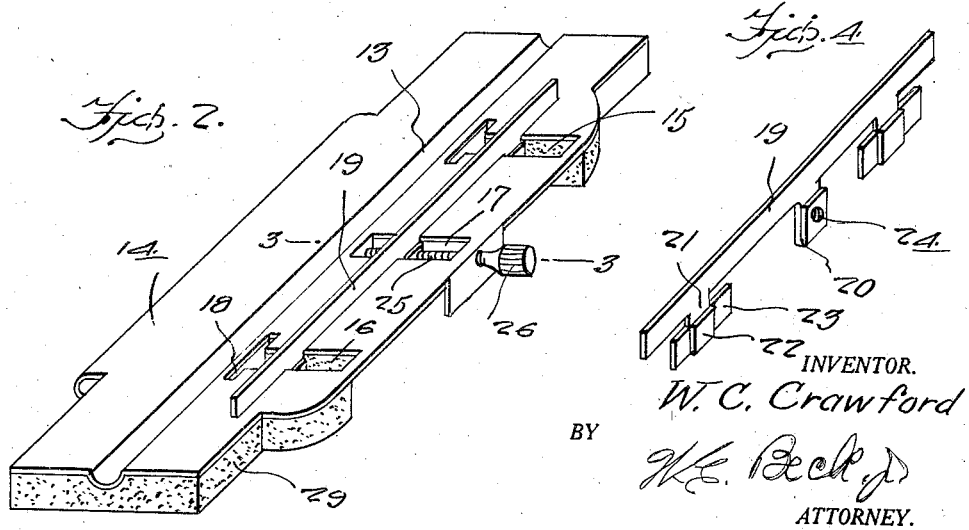
INVENTOR.
W. C. Crawford
BY
W. E. Beck Jr.
ATTORNEY.

Patented July 29, 1930

1,771,434

UNITED STATES PATENT OFFICE

WALTER C. CRAWFORD, OF BOGOTA, NEW JERSEY

BREAD SLICER

Application filed December 6, 1928. Serial No. 324,254.

The present invention relates to bread slicer of a type adapted particularly for use in slicing bread and similar loaf food, the board including in its construction a knife guide for directing the knife in a straight vertical path, the present invention having for its principal object to provide means for adjusting the width or thickness of the slice of the food to be cut from the loaf.

A further object of the invention is to provide a cutting base having an upwardly extending guide adjustably carried thereon with means operable forwardly of the plate for moving the guide relative to the end of the food from which slices are to be cut whereby to regulate the width or thickness of such slices.

A still further object is to provide a device of this character of a simple and practical construction, which may be easily and quickly adjusted to any desired position without necessitating a removal of the loaf from the base, which is inexpensive to manufacture and otherwise well adapted for the purposes for which the same is intended.

Other objects and advantages reside in the special construction, combination and arrangement of the various elements forming the invention, as more fully hereinafter described and claimed, reference being had to the accompanying drawing forming part hereof, wherein like numerals refer to like parts throughout the specification and in which Figure 1 is a side elevational view of the complete bread slicer in operative position, Figure 2 is a perspective view of the cutting end or base of the slicer.

Figure 3 is a fragmentary vertical sectional view through said base taken along a line 3—3 of Figure 2, and Figure 4 is a perspective view of the guide detached from the base.

The present invention comprises an improvement over my co-pending application, Serial #293,358, in which a bread slicer is disclosed comprising a work supporting board 5 having a pair of upright frames 6 and 7, respectively, secured at one end and disposed in closely spaced relation to act as a guide for a knife when moved vertically through the space 8 formed between said members. The board 5 is hingedly connected as at 9 to a cutting base 10 whereby to permit the board to swing upwardly in a vertical position at the rear side of the upright members 6 and 7 in order to fold the device in a compact manner when not in use. The upright 6 is supported by means of a folding brace 11 attached at one end to the board 5. The forwardly disposed upright member 7 also carries a spring 12 for yieldably urging the knife against the forward edge of the rear upright member 6 during the cutting action.

The cutting base 10 has its upper surface formed with a transverse groove 13 arranged immediately beneath the space formed between the upright knife guides 6 and 7 so that the knife may pass through the food below the surface 14 of the base and completely sever a slice of food from the loaf. A plurality of recesses 15 are arranged in the upper surface of the base forwardly of the groove 13, and include side recesses 16 and an intermediate recess 17. The ends of the side recesses adjacent the groove are formed with lateral extensions 18. A guide 19 is arranged on edge upon the upper surface 14 of the base and extends upwardly therefrom and is formed along its lower edge with an intermediate projection 20 and end projections 21.

Each of the end projections are provided with a strip of material 22 disposed in spaced parallel relation from the lower edge of the guide and formed with wings 23. The strips 22 are secured to the projections 21 in any suitable manner well known in the art, the center portion of the strips disposed against the projections being off-set to allow for the width of the material as illustrated in Figure 4 of the drawing. The center projection 20 is adapted for insertion in the center recess 17 of the base and the wings 23 of the end projections are adapted to be inserted in the lateral extensions 18 of the end recesses 16 so that when arranged in the manner indicated, the guide 19 will rest with its lower edge upon the surface 14 of the base and may move outwardly from the groove 13, the wings 23 engaging the under side of the base at the edges of the recesses whereby to prevent the removal of the guide from the base.

The center projection 20 is formed with a threaded opening 24 through which a screw 25 is threaded, the screw having one end extending outwardly through an opening in a flange 26 formed at the front edge of the base and having its inner end journalled in a support 27 formed at the under side of the base. The outer end of the screw is formed into an operating knob 26. The base 10 is preferably constructed of sheet metal and has its under side supported on a rubber or similar pad 29 to prevent injury to any surface upon which the device may be placed and also to elevate the base sufficiently to enable the free movement of the guide without interference by the supporting surface upon which the device may be placed.

It will be apparent from the foregoing that through the adjustment of the guide 19 and by placing the end of the loaf from which slices are to be cut against the guide that the width or thickness of the slice will be regulated as desired.

It is obvious that the invention is susceptible of various changes and modifications without departing from the spirit thereof or the scope of the appended claim, and I accordingly claim as my own all such forms of the invention to which I am entitled.

I claim:

A cutting base for slicing boards of the class described comprising a sheet of metal having a transversely extending groove formed in its upper surface for receiving the knife upon the completion of the cutting operation, said base having a plurality of spaced recesses formed therein forwardly of the groove and including end recesses and an intermediate recess, said end recesses having lateral extensions formed at their inner ends, a guide member arranged upon the base in parallel relation with the groove and having projections depending from its lower edge and including end projections and an intermediate projection, wings formed on said projections parallel with the guide and adapted for insertion in the extensions of the end recesses and engageable with the under side of the base at the edges of said recesses upon the forward movement of the guide whereby to prevent removal of the guide from the base, said intermediate projection having a threaded opening and adapted for insertion in said intermediate recess and a screw carried by the base and threadedly inserted in said opening whereby to adjust the guide member with respect to said groove.

In testimony whereof I affix my signature.

WALTER C. CRAWFORD.